United States Patent [19]

Asama et al.

[11] Patent Number: 5,461,271
[45] Date of Patent: Oct. 24, 1995

[54] BRUSHLESS MOTOR WITH ELASTIC SUPPORTS

[75] Inventors: Kiichi Asama; Hiroo Ashibe, both of Komagane, Japan

[73] Assignee: Sankyo Seiki Mfg. Co. Ltd., Nagano, Japan

[21] Appl. No.: 239,337

[22] Filed: May 6, 1994

[30] Foreign Application Priority Data

May 13, 1993 [JP] Japan .............. 5-030156 U

[51] Int. Cl.$^6$ .............. H02K 5/04; H02K 7/08
[52] U.S. Cl. .............. 310/91; 310/67 R
[58] Field of Search .............. 310/67 R, 90, 310/91, 254, 267, 156, 194; 360/98.07, 99.07

[56] References Cited

U.S. PATENT DOCUMENTS

| | | | |
|---|---|---|---|
| 4,578,606 | 3/1986 | Welterlin | 310/68 R |
| 4,626,727 | 12/1986 | Janson | 310/156 |
| 5,173,628 | 12/1992 | Yoshida et al. | 310/71 |
| 5,254,895 | 10/1993 | Koizumi | 310/156 |
| 5,304,879 | 4/1994 | Suzuki et al. | 310/67 R |

FOREIGN PATENT DOCUMENTS 0013256  1/1990  Japan .............. 310/91

*Primary Examiner*—Steven L. Stephan
*Assistant Examiner*—D. R. Haszko

[57] ABSTRACT

A brushless motor comprises a bearing rotatably supporting a spindle and a rotor mounted on the spindle. A drive magnet rotates integrally with the rotor. A stator core is disposed to face the drive magnet and has a drive coil wound thereon. A base plate is included on which the stator core is mounted. A bearing holder is provided for holding the bearing, which engages the base plate. A fixing plate is arranged for positioning and fixing the bearing holder and the stator core on the base plate. A fastening member is arranged for fastening the fixing plate to the base plate with bearing holder disposed between the base plate and the fixing plate and with the fixing plate engaged with the bearing holder.

5 Claims, 4 Drawing Sheets

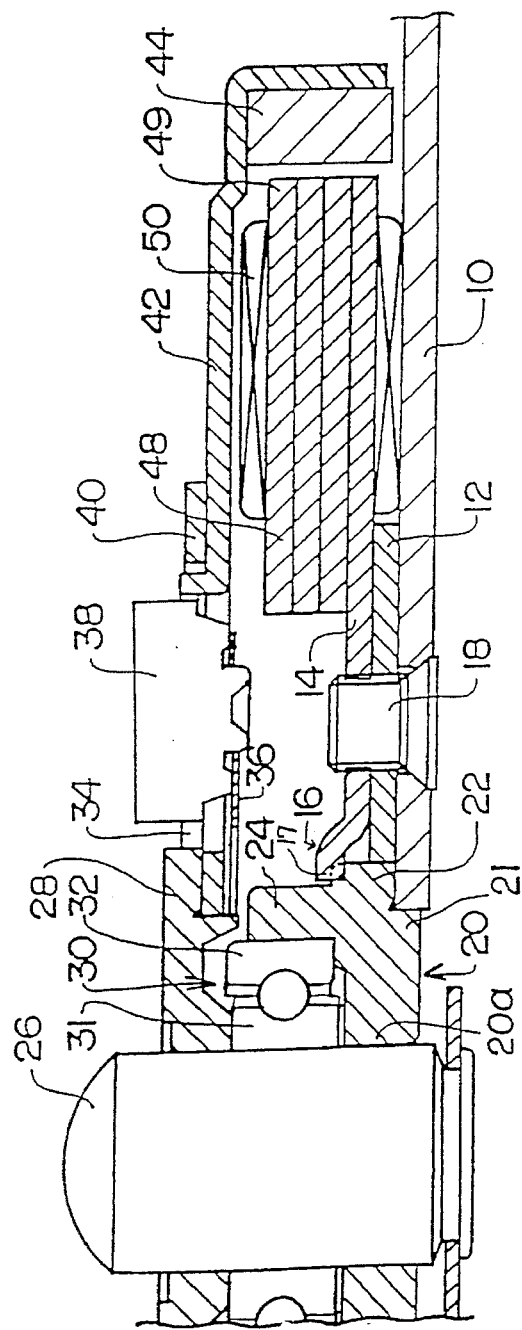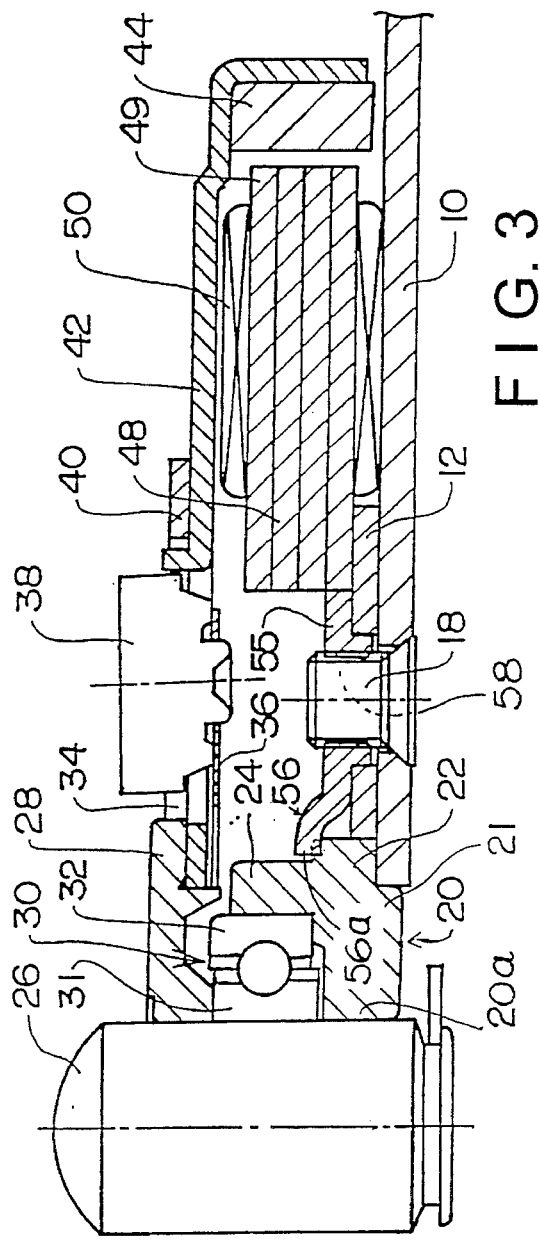

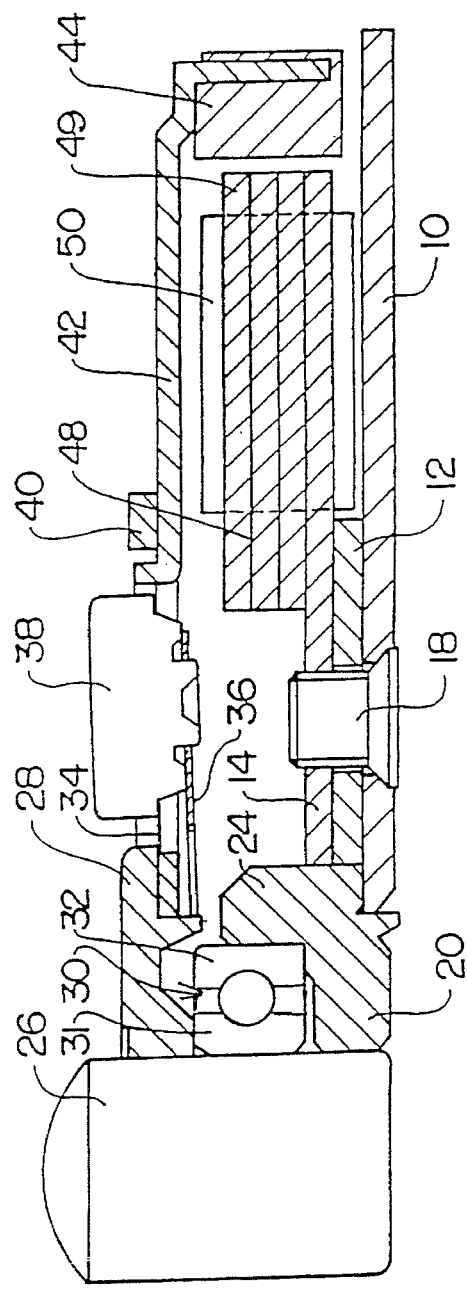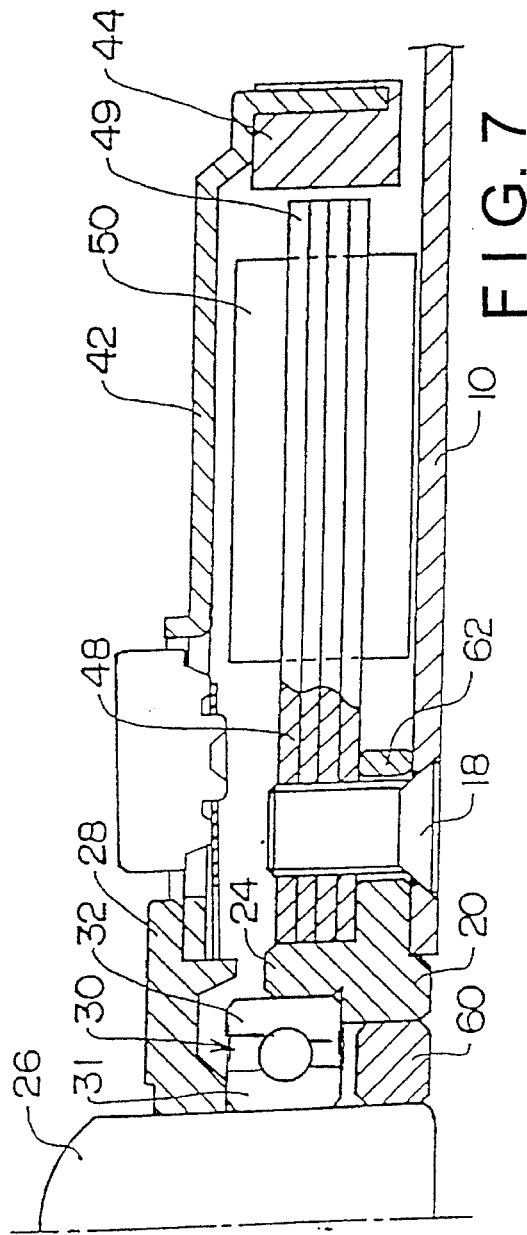

BRUSHLESS MOTOR WITH ELASTIC SUPPORTS

BACKGROUND OF THE INVENTION a) Field of Use

The present invention relates to a brushless motor having a stator core, and, more particularly, to a structure for fixing a stator core and a bearing holder.

b) Description of the Related Art

Examples of conventional circumferentially opposed type brushless motors include those having the kind of structure shown in FIG. 6.

In FIG. 6, the lower end portion of a bearing holder 20 is fixed by press fitting or caulking in the central portion (the left hand end in the drawing) of a base plate 10 made of steel plate or the like.

A spacer 12 is mounted on the base plate 10 around the periphery of the bearing holder 20, and a stator core 48 is mounted on the spacer 12. The stator core 48 comprises a number of core plates stacked one on top of another and fixed together by caulking. The inner periphery of the lowest core plate 14 in the drawing extends toward the center. Screws 18 pass through the base plate 10 and the spacer 12 and are screwed into the core plate 14, and the stator core 48 is thereby fixed to the base plate 10. The stator core 48 has a large number of salient poles disposed radially at its outer periphery. Each of these salient poles has a salient pole bevel portion 49 at its outer end and a drive coil 50 wound around it.

The bearing holder 20 has a cylindrical portion 24, and the outer ring 32 of a ball bearing 30 is press fitted in this cylindrical portion. A spindle 26 is inserted (clearance fitted) in the inner ring 31 of the ball bearing 30. A hub plate 28 is integrally mounted on the end of the spindle 26 which projects upward of the ball bearing 30, and a flat cuplike rotor 42 is mounted on the underside of the hub plate 28. A platelike chucking magnet 40 is mounted on top of the rotor 42. A plate spring 36 is fitted to the underside of the rotor 42, and a drive pin 38 supported by the plate spring 36 passes through a hole 34 in the rotor 42 and projects upward of the upper surface of the hub plate 28.

A drive magnet 44 is fixed to the inner surface of the peripheral wall of the rotor 42 and rotates integrally with the rotor 42. The inner surface of the drive magnet 44 faces the salient pole bevel portions 49 of the stator core 48 across a suitable gap.

The above-described circumferentially opposed type brushless motor having a stator core is constructed so that the rotor 42 can be rotationally driven by detection of rotational position of the drive magnet 44 and by switching of electrical currents through the drive coils 50 in accordance with this detection signal.

Next, another example of a conventional brushless motor, shown in FIG. 7, will be described.

This conventional motor differs from the example shown in FIG. 6 in that the bearing holder 20 has an outer flange portion 62 around its lower portion.

Also, all the core plates constituting the stator core 48 extend radially inward to a position such that their inner peripheral edge surfaces make contact with the outer peripheral surface of the cylindrical portion 24 of the bearing holder 20 and their inner peripheral portions are stacked on the flange portion 62 of the bearing holder 20, and the whole stator core 48 is fixed on the base plate 10 by screws 18 being passed through the base plate 10 and the flange portion 62 and screwed into the stator core 48. The flange portion 62 of the bearing holder 20 is clamped between the stator core 48 and the base plate 10.

This motor also differs from the example shown in FIG. 6 in that the inner surface of the bearing holder 20 comprises a large diameter upper portion and a small diameter lower portion, and a ball bearing 30 is disposed in the large diameter portion and a metal bearing 60 is disposed in the small diameter portion.

Problems Addressed by the Invention

In the conventional brushless motor constructions described above, because the bearing holder is fixed to the base plate by press fitting or caulking, depending on how force is applied to it during the press fitting or caulking process, the shape of the bearing holder can easily be deformed and variation in the internal diameter and height dimensions and inclination of the bearing holder can occur.

Also, in the case where the whole stator core is fixed to the base plate this is done in order to raise the strength of the fastening between the screws and the stator core, but because a lot of space is required where the stator core is mounted on the base plate, it is difficult to secure enough space for the drive pin to descend below the rotor. Furthermore, because the flange portion of the bearing holder outwardly extends far from the rest of the bearing holder, material usage is poor, machining is complicated and this leads to higher cost.

OBJECT AND SUMMARY OF THE INVENTION

The invention, accordingly, is directed to resolving these kinds of problem associated with conventional technology and has, as a primary object, the provision of a brushless motor wherein the structure by which the bearing holder and the stator core are fixed to the base plate is simplified and as a result the assembly process can be simplified and the assembly time can be shortened and wherein deformation of the base plate and the bearing holder is eliminated, inclination and dimensional variation of the bearing holder are eliminated and the precision of the motor is therefore improved.

In accordance with the invention, a brushless motor comprises a bearing rotatably supporting a spindle and a rotor mounted on the spindle. A drive magnet rotates integrally with the rotor. A stator core is disposed to face the drive magnet and has a drive coil wound thereon. A base plate is included on which the stator core is mounted. A bearing holder is provided for holding the bearing, which engages the base plate. A fixing plate is arranged for positioning and fixing the bearing holder and the stator core on the base plate. A fastening member is arranged for fastening the fixing plate to the base plate with bearing holder disposed between the base plate and the fixing plate and with the fixing plate engaged with the bearing holder.

For a better understanding of the present invention, reference is made to the following description and accompanying drawings while the scope of the invention will be pointed out in the appended claims.

BRIEF DESCRIPTION OF THE DRAWINGS

FIG. 1 is a sectional view of a first preferred embodiment of a brushless motor according to the invention;

FIG. 3 is a sectional view showing a second preferred embodiment of a brushless motor according to the invention;

FIG. 6 is a sectional view of a conventional brushless motor; and

FIG. 7 is a sectional view of another example of a conventional brushless motor.

DESCRIPTION OF THE PREFERRED EMBODIMENTS

Figure 2:
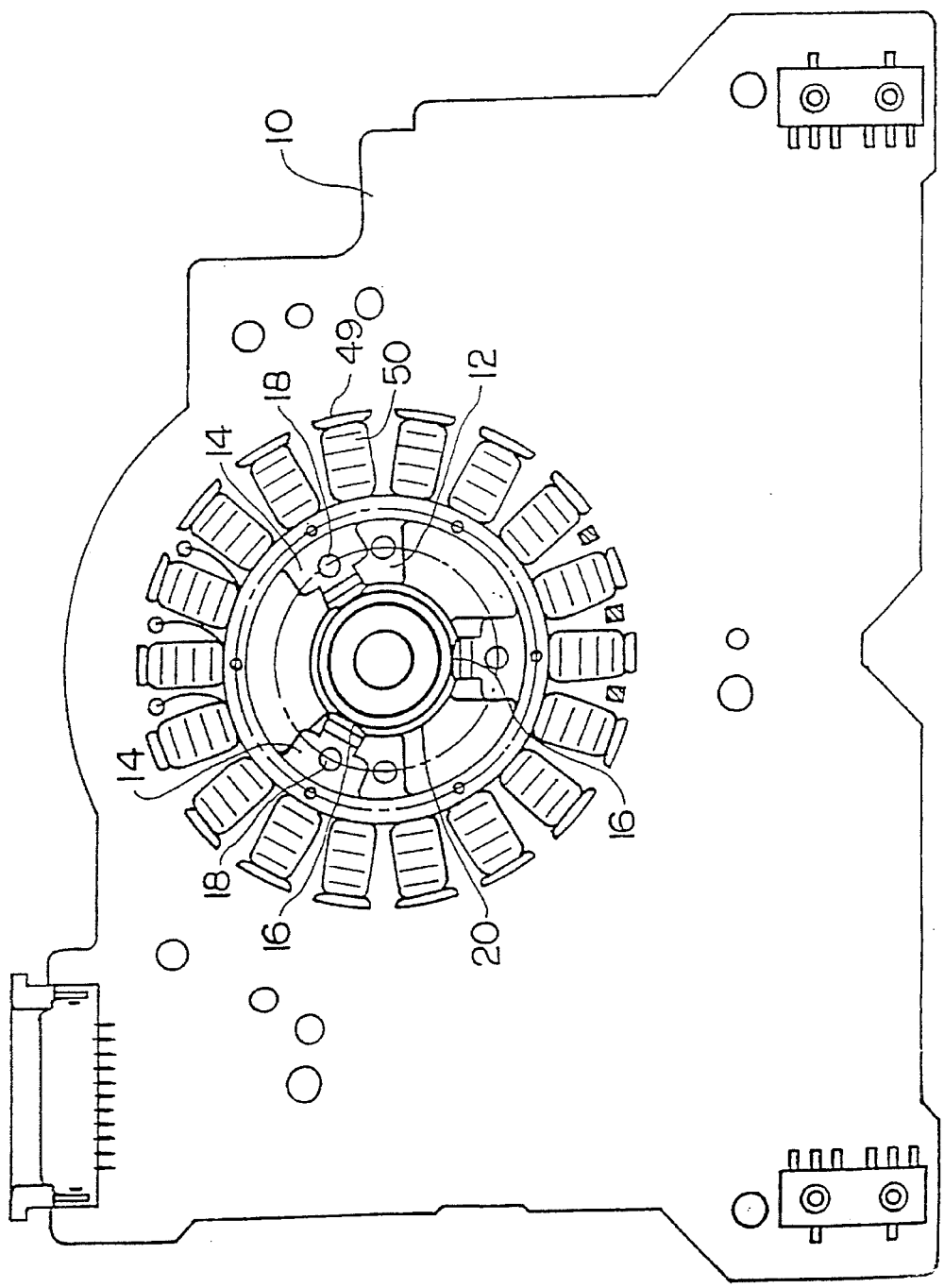
FIG. 2 is a plan view of a stator part of the first preferred embodiment.

Preferred embodiments of a brushless motor according to the invention will now be described, with reference to the accompanying drawings. In the drawings, constituent parts which correspond to constituent parts of the conventional examples shown in FIG. 6 and FIG. 7. have been given the same reference numerals as the parts in FIG. 6 and FIG. 7 to which they correspond.

A first preferred embodiment is shown in FIG. 1 and FIG. 2. Referring to FIG. 1 and FIG. 2, a hole is formed in the central portion of a steel base plate 10 which also serves as a stator yoke, and the base portion 21 of a bearing holder 20 is fitted into this hole. A flange portion 22 formed on the bearing holder 20 lies on the portion of the base plate 10 around the hole.

A spacer 12 is mounted on the steel base plate 10; this spacer 12 is fitted around the outer peripheral surface of the bearing holder 20 and by way of the bearing holder 20 a stator core 48 is thereby positioned with respect to a spindle 26 constituting the rotational center of the brushless motor.

The spacer 12 has a certain thickness in the axial direction and preserves a predetermined relationship between drive coils 50 wound on the stator core 48 and the base plate 10.

The stator core 48 comprises a number of core plates stacked one on top of another, and this stator core 48 is superposed on the spacer 12 as shown in FIG. 1 and fixed integrally to the spacer 12 by caulking.

One core plate 14 of the stator core 48 functions as a fixing plate. That is, this core plate 14 has some elasticity and is provided with engaging portions 16 extending toward the center from 3 locations (roughly uniformly disposed) on its inner periphery; the engaging portions 16 comprise bent portions 17 which slope diagonally upward and then curve to the horizontal, and these engaging portions 16, as shown in FIG. 1, engage with the top of the flange portion 22 of the bearing holder 20.

Screws 18 serving as fastening members pass through the base plate 10 and the spacer 12 from below and are screwed into the core plate 14, whereby the flange portion 22 of the bearing holder 20 is clamped between the steel base plate 10 and the engaging portions 16 of the core plate 14 serving as a fixing plate and the bearing holder 20 is thereby fixed to the steel base plate 10 and the stator core 48 is also fixed to the steel base plate 10.

Because the engaging portions 16 of the core plate 14 are elastic, when the fixing plate (the core plate 14) is fastened by the screws 18, the bent portions 17 of the engaging portions 16 are deformed by the flange portion 22 of the bearing holder 20. As a result of this deformation, reaction forces tending to restore the bent portions 17 to their original shape act on the bearing holder 20 and the bearing holder 20 is fixed to the steel base plate 10 by these forces.

At this time, because elastic force is being used, machining errors of the various parts can be absorbed and also the reaction forces prevent the bearing holder 20 from rotating.

As shown in FIG. 2, the stator core 48 has 18 radially disposed salient poles, a drive coil 50 is wound around each of the salient poles, and the outer end portion of each salient pole is a salient pole bevel portion 49 which is wide in the circumferential direction.

As shown in FIG. 1, the bearing holder 20 has a cylindrical portion 24 and the outer ring 32 of a ball bearing 30 is fitted inside this cylindrical portion 24.

A spindle 26 is fitted in the inner ring 31 of the ball bearing 30 and rotatably supported by the ball bearing 30.

The bearing holder 20 is provided with a bearing portion 20a formed below the ball bearing 30, and the face of the bearing portion 20a makes contact with the spindle 26 and functions as a bearing.

A hub plate 28 is integrally mounted on the upper end portion of the spindle 26, and a flat cuplike rotor 42 is mounted on the underside of the hub plate 28. A platelike chucking magnet 40 running all the way around the hub plate 28 is mounted on top of the rotor 42. A plate spring 36 is fitted to the underside of the rotor 42, and a drive pin 38 supported by the plate spring 36 passes through a hole 34 in the rotor 42 and projects upward of the upper surface of the hub plate 28. A drive magnet 44 is fixed to the inner surface of the peripheral wall of the rotor 42 and rotates integrally with the rotor 42. The inner surface of the drive magnet 44 faces the salient pole bevel portions 49 of the stator core 48 across a suitable gap.

The drive coils 50 comprise a suitable number of phases, for example three phases; based on a magnet 44 magnetic pole detection signal from a magnetic sensor, electrical currents through the drive coils 50 of each phase are switched, the drive magnets 44 are urged and the rotor 42 is thereby continuously rotationally driven.

According to the first preferred embodiment described above, because the spacer 12 constituting part of the stator core 48 is clamped between the steel base plate 10 and a core plate 14 serving as a fixing plate and the core plate 14 is fastened to the steel base plate 10 by screws 18 serving as fastening members with the engaging portions 16 (the bent portions 17) of the core plate 14 serving as a fixing plate engaged with the flange portion 22 of the bearing holder 20, the bearing holder 20 and the stator core 48 can be fixed to the steel base plate 10 just by placing the steel base plate 10, the bearing holder 20 and the stator core 48 having the spacer 12 integral with it in position and screwing in the screws 18; assembly can be simplified and the assembly time reduced, and because there is no need to fix the bearing holder 20 or the stator core 48 by caulking or press fitting or the like, it is possible to prevent variation in the inner diameter and height dimensions and inclination of the bearing holder.

Also, when a bearing holder is to be fixed to a steel base plate by caulking, as has been done conventionally, to prevent variation in the inner diameter and height dimensions and inclination of the bearing holder, spin caulking is sometimes used in order to minimize the deformation of the bearing holder caused by the caulking; however, there has been the problem that because in spin caulking the caulking pressure is increased more gradually than in ordinary caulking the work time is lengthened and the workability is poor.

According to the first preferred embodiment above, spin caulking is not necessary and reduced workability can be avoided.

Also, because fixing of the bearing holder and the fixing of the stator core can be carried out simultaneously by using the fixing plate, the workability can be improved, and because assembly can be carried out by superposing the parts in one direction there is the merit that the assembly workability is good and automatic assembly can be applied.

Next, modified preferred embodiments of a brushless motor according to the invention will be described.

Whereas in the preferred embodiment shown in FIG. 1 and FIG. 2 one of the core plates constituting the stator core, the core plate 14, was made to serve as a fixing plate, the second preferred embodiment described below has an independent fixing plate.

Figure 4:
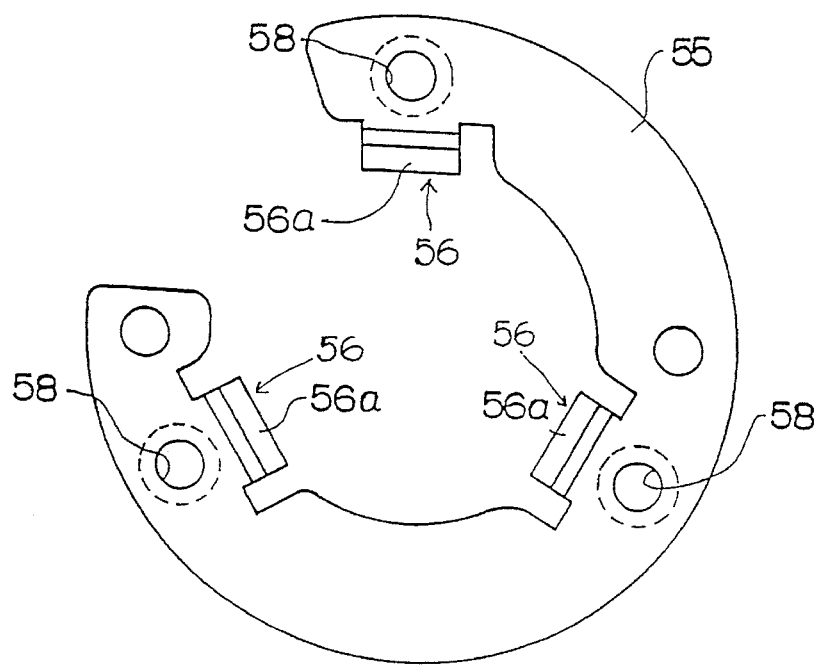
FIG. 4 is a plan view of a fixing plate in the second preferred embodiment.

Referring to FIG. 3 and FIG. 4, which show the second preferred embodiment, the base portion 21 of a bearing holder 20 is fitted into a hole in the central portion of a steel base plate 10 and a flange portion 22 of a bearing holder 20 lies on the portion of the steel base plate 10 around the hole.

A spacer 12 is mounted on the steel base plate 10; this spacer 12 is fitted around the outer peripheral surface of the bearing holder 20 and by way of the bearing holder 20 a stator core 48 is thereby positioned with respect to a spindle 26 constituting the rotational center of the brushless motor.

The spacer 12 has a certain thickness in the axial direction and preserves a predetermined relationship between drive coils 50 wound on the stator core 48 and the base plate 10.

The stator core 48 comprises a number of core plates stacked one on top of another; the stator core 48 is superposed on the spacer 12 as shown in FIG. 3 and the stator core 48 and the spacer 12 are fixed integrally together by caulking.

A fixing plate 55 is mounted on the spacer 12, radially inward of the stator core 48.

The fixing plate 55 has some elasticity and as shown in FIG. 4 has the shape of a ring with a portion cut out of it and is provided with engaging portions 56 extending toward the center from 3 locations (roughly uniformly disposed) on its inner periphery; a boss hole 58 is formed adjacent to each of the engaging portions 56 and the inner peripheries of the boss holes 58 are threaded. The engaging portions 56 comprise bent portions 56a which slope diagonally upward and then curve to the horizontal, and these engaging portions 56, as shown in FIG. 3, engage with the top of the flange portion 22 of the bearing holder 20. The outer peripheries of the boss holes 55 are fitted into holes in the spacer 12, and the fixing plate 55 is thereby positioned relative to the spacer 12.

Screws 18 serving as fastening members pass through the base plate 10 from below and are screwed into the boss holes 58 in the fixing plate 55, whereby the flange portion 22 of the bearing holder 20 is clamped between the steel base plate 10 and the engaging portions 56 of the fixing plate 55 and thereby the bearing holder 20 is fixed to the steel base plate 10 and the spacer 12 integral with the stator core 48 is clamped between the steel base plate 10 and the fixing plate 55 and the stator core 48 is fixed to the steel base plate 10.

Because the engaging portions 56 of the fixing plate 55 are elastic, when the fixing plate 55 is fastened by the screws 18, the bent portions 56a of the engaging portions 56 are deformed by the flange portion 22 of the bearing holder 20. As a result of this deformation, reaction forces tending to restore the bent portions 56a to their original shape act on the bearing holder 20 and the bearing holder 20 is fixed to the steel base plate 10 by these forces.

At this time, because elastic force is being used, machining errors of the various parts can be absorbed and also the reaction forces prevent the bearing holder 20 from rotating.

The shape of the fixing plate 55 is not limited to the shape shown in FIG. 4 and for example may be a complete ring with no cutout.

The second preferred embodiment shown in FIG. 3 and FIG. 4 provides the same benefits as the first preferred embodiment shown in FIG. 1 and FIG. 2. Also, both in the case of the first preferred embodiment shown in FIG. 1 and FIG. 2 and in the case of the second preferred embodiment shown in FIG. 3 and FIG. 4, the inner periphery of the spacer 12 integral with the stator core 48 fits with a suitable clearance around the outer surface of the bearing holder 20 and positions the center of the stator core 48 with respect 14 to the center axis of the ball bearing 30.

Figure 5:
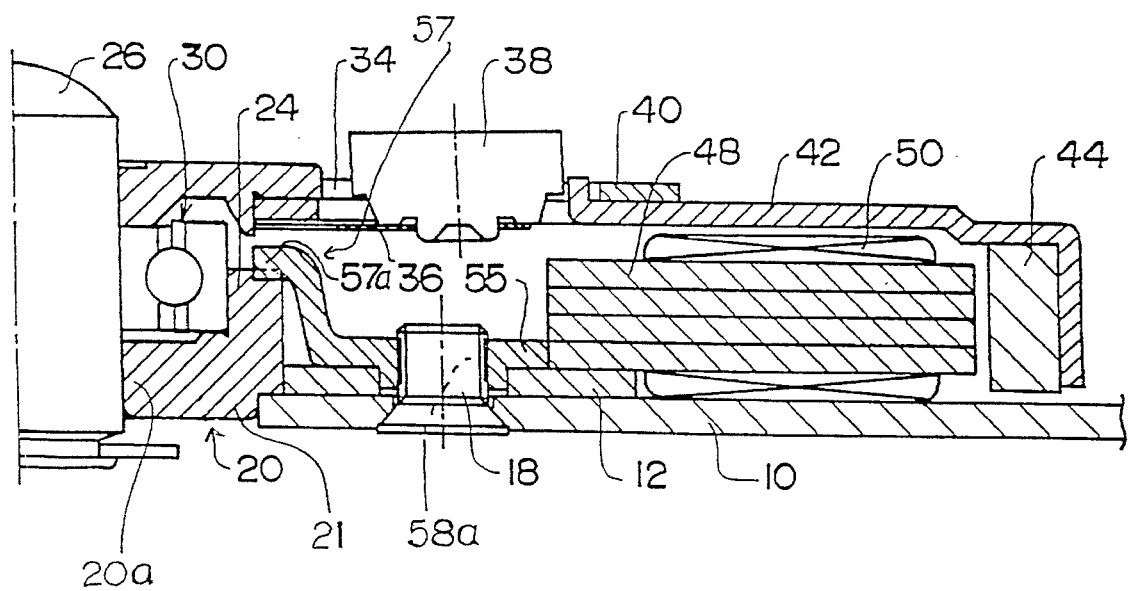
FIG. 5 is a sectional view of a third preferred embodiment of a brushless motor according to the invention.

In the second preferred embodiment of FIG. 3 and FIG. 4, the engaging portions 56 of the fixing plate 55 were made to engage with the flange portion 22 of the bearing holder 20; however, as in a third preferred embodiment shown in FIG. 5, the bearing holder 20 can have no flange portion and elastic engaging portions 57 which rise far up from suitable places on the inner periphery of a fixing plate 55 and then curve to the horizontal can be made to engage with the upper end of the bearing holder 20, as shown in FIG. 5. In other respects the construction of this third preferred embodiment is the same as that of the first and second preferred embodiments and therefore a detailed explanation thereof will be omitted.

This third preferred embodiment provides similar benefits to those of the first and second preferred embodiments described above.

Although in the first, second and third preferred embodiments shown in the drawings screws were used as the fastening members for fastening the fixing plate to the steel base plate, rivets may be used instead of screws.

Also, although the first, second and third preferred embodiments shown in the drawings were all constructed as motors for use in floppy disc drives, the invention is not limited to this application and can be applied to motors used for any of various purposes.

According to the invention, because the fixing plate is fastened to the base plate with fastening members with the stator core clamped between the base plate and the fixing plate and the fixing plate engaged with the bearing holder, the bearing holder and the stator core can be fixed to the base plate just by putting the bearing holder, the stator core and the fixing plate in position and fastening the fixing plate to the base plate with the fastening members, and the assembly process can be simplified and assembly time can be reduced. Furthermore, because it is not necessary to fix the bearing holder or the stator core by caulking or press fitting or the like it is possible to prevent variation of the inner diameter and height dimensions and inclination of the bearing holder.

While the foregoing description and drawings represent the preferred embodiments of the present invention, it will be obvious to those skilled in the art that various changes and modifications may be made therein without departing from the true spirit and scope of the present invention.

What is claimed is:

1. A brushless motor comprising:

a bearing rotatably supporting a spindle;

a rotor mounted on the spindle;

a drive magnet which rotates integrally with the rotor;

a stator core disposed facing the drive magnet and having a drive coil wound thereon;

a base plate on which the stator core is mounted;

a bearing holder for holding the bearing and engaging with the base plate;

a fixing plate for positioning and fixing the bearing holder and the stator core on the base plate, said fixing plate comprising a plurality of elastic engaging portions for engaging with and positioning and fixing the bearing holder; and a fastening member for fastening the fixing plate to the base plate with the bearing holder interposed between the base plate and the fixing plate and with the fixing plate engaged with the bearing holder.

2. The brushless motor according to claim 1, wherein the base plate comprises a steel plate.

3. The brushless motor according to claim 1, wherein the fixing plate comprises a portion of the stator core extending radially inward.

4. The brushless motor according to claim 1, wherein the fastening member is a screw.

5. The brushless motor according to claim 1, wherein a portion of the fixing plate which engages with the bearing holder is a bent portion.

* * * * *